(No Model.) 9 Sheets—Sheet 1.
W. R. CUNNINGHAM.
MACHINE FOR CUTTING BRICK OR OTHER CLAY PRODUCTS.
No. 411,546. Patented Sept. 24, 1889.
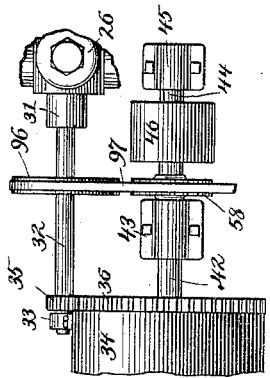
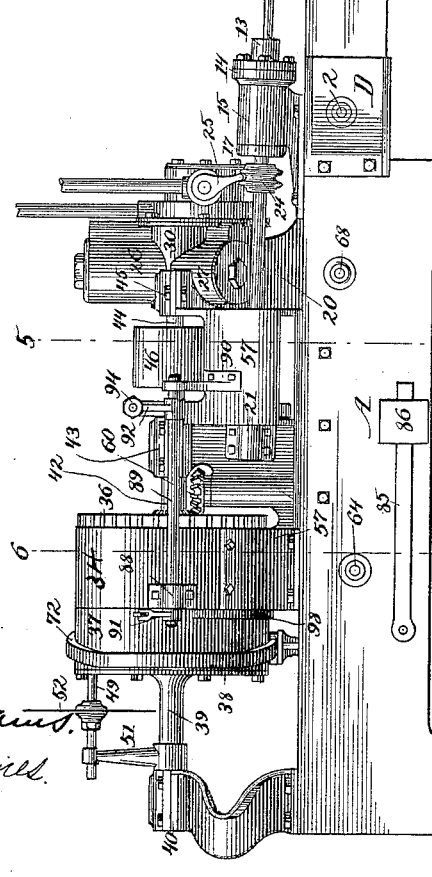
Witnesses:
Albert K. Adams
Harry T. Jones
Inventor:
W. R. Cunningham (No Model.) 9 Sheets—Sheet 2.
W. R. CUNNINGHAM.
MACHINE FOR CUTTING BRICK OR OTHER CLAY PRODUCTS.
No. 411,546. Patented Sept. 24, 1889.
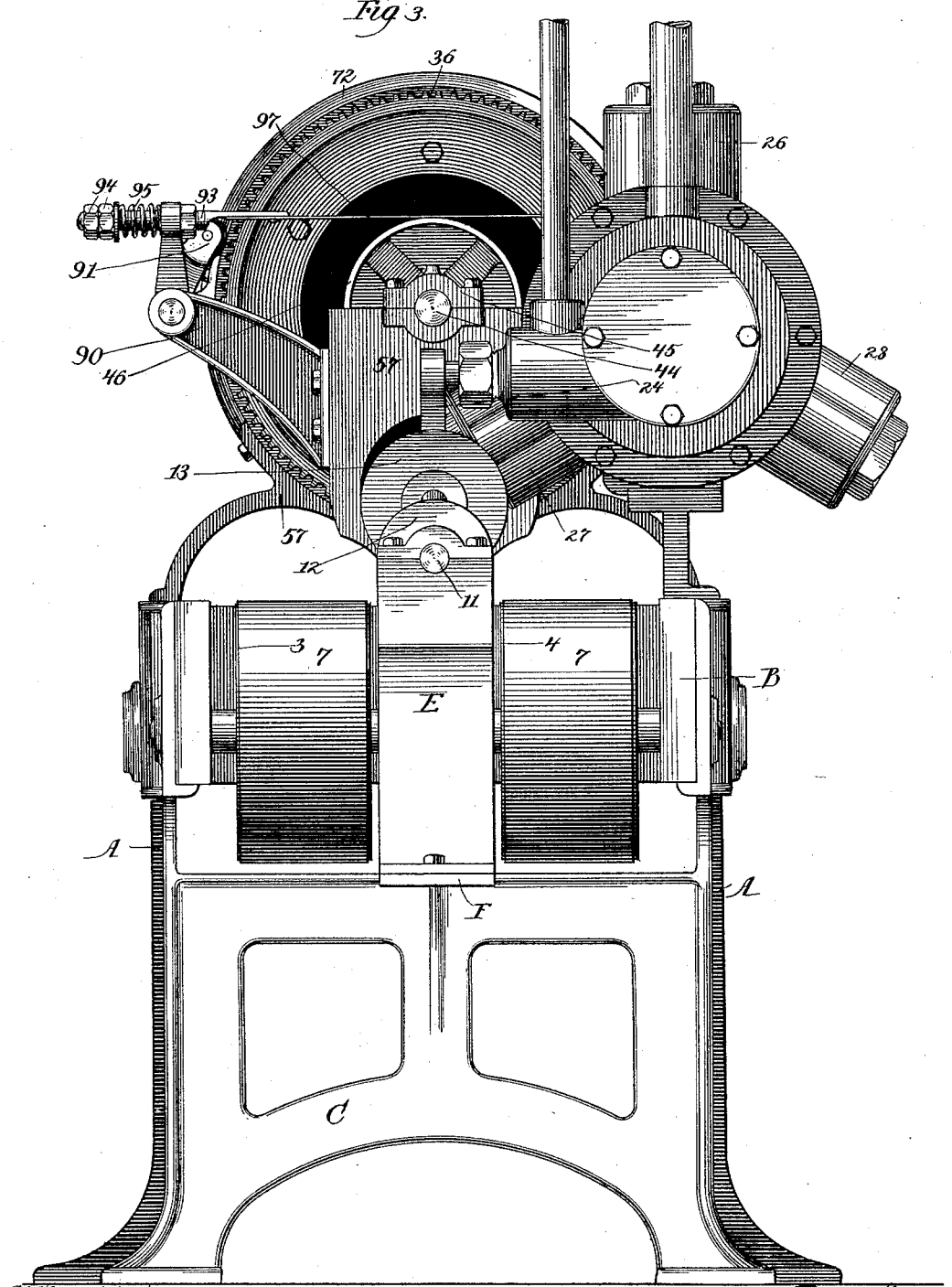

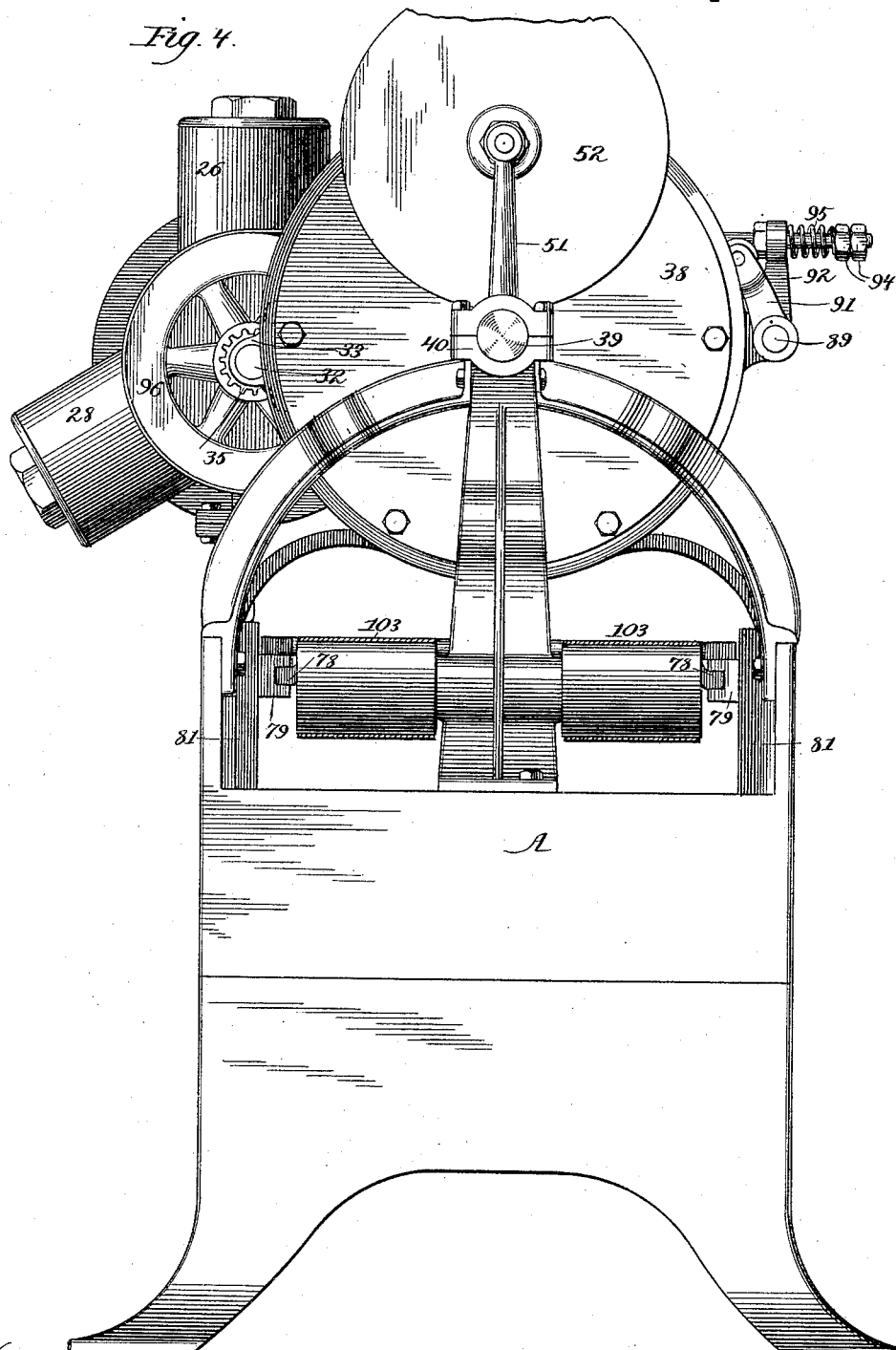

(No Model.) 9 Sheets—Sheet 4.
W. R. CUNNINGHAM.
MACHINE FOR CUTTING BRICK OR OTHER CLAY PRODUCTS.
No. 411,546. Patented Sept. 24, 1889.

Witnesses:
Albert H. Adams.
Harry T. Jones.

Inventor:
William R. Cunningham (No Model.) 9 Sheets—Sheet 5.

W. R. CUNNINGHAM.
MACHINE FOR CUTTING BRICK OR OTHER CLAY PRODUCTS.

No. 411,546. Patented Sept. 24, 1889.

(No Model.) 9 Sheets—Sheet 6.

W. R. CUNNINGHAM.
MACHINE FOR CUTTING BRICK OR OTHER CLAY PRODUCTS.

No. 411,546. Patented Sept. 24, 1889.

Witnesses:
Albert H. Adams,
Harry T. Jones.

Inventor:
William R. Cunningham (No Model.) 9 Sheets—Sheet 7.
W. R. CUNNINGHAM.
MACHINE FOR CUTTING BRICK OR OTHER CLAY PRODUCTS.
No. 411,546. Patented Sept. 24, 1889.
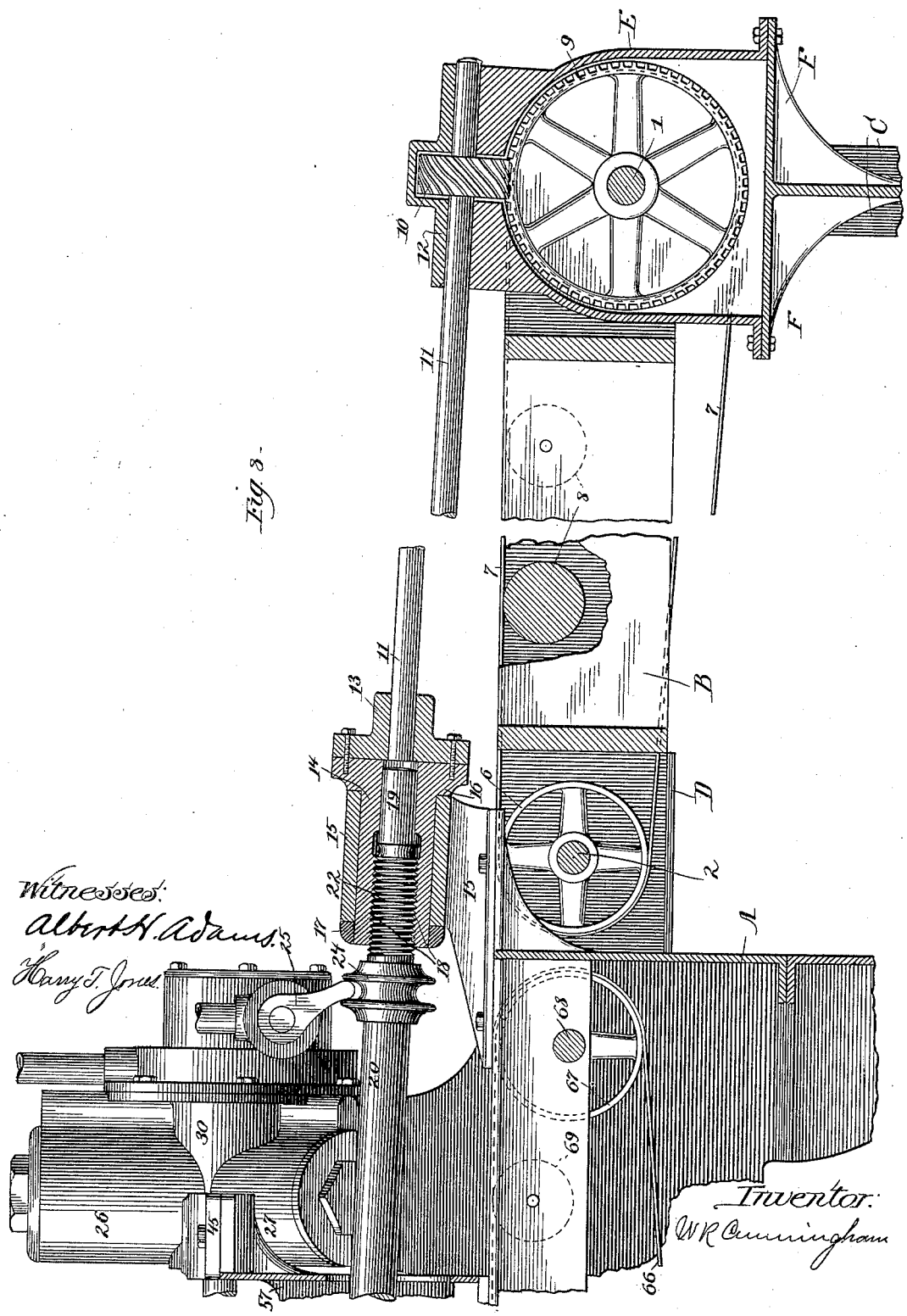

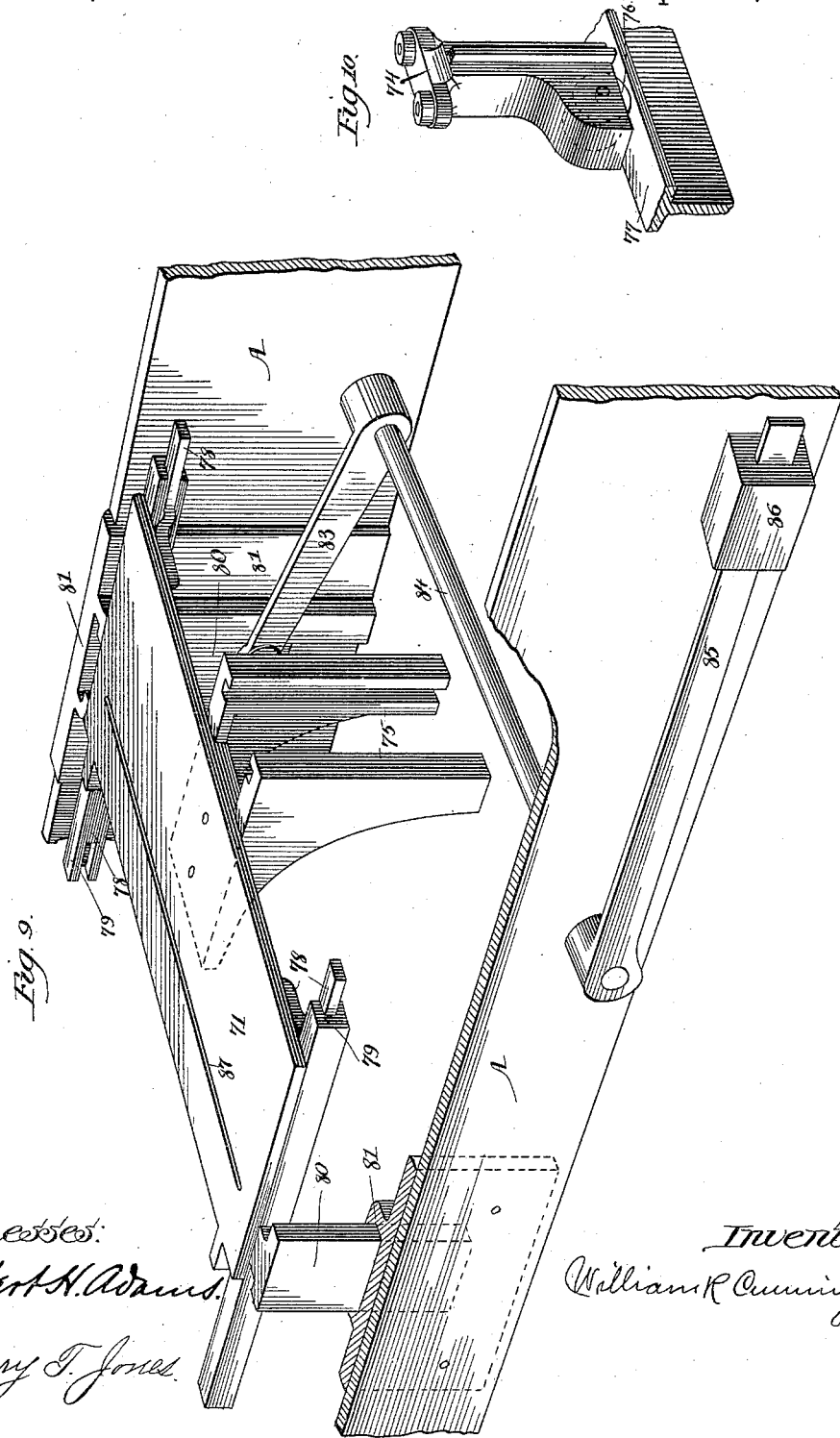

(No Model.) 9 Sheets—Sheet 9.
W. R. CUNNINGHAM.
MACHINE FOR CUTTING BRICK OR OTHER CLAY PRODUCTS.
No. 411,546. Patented Sept. 24, 1889.
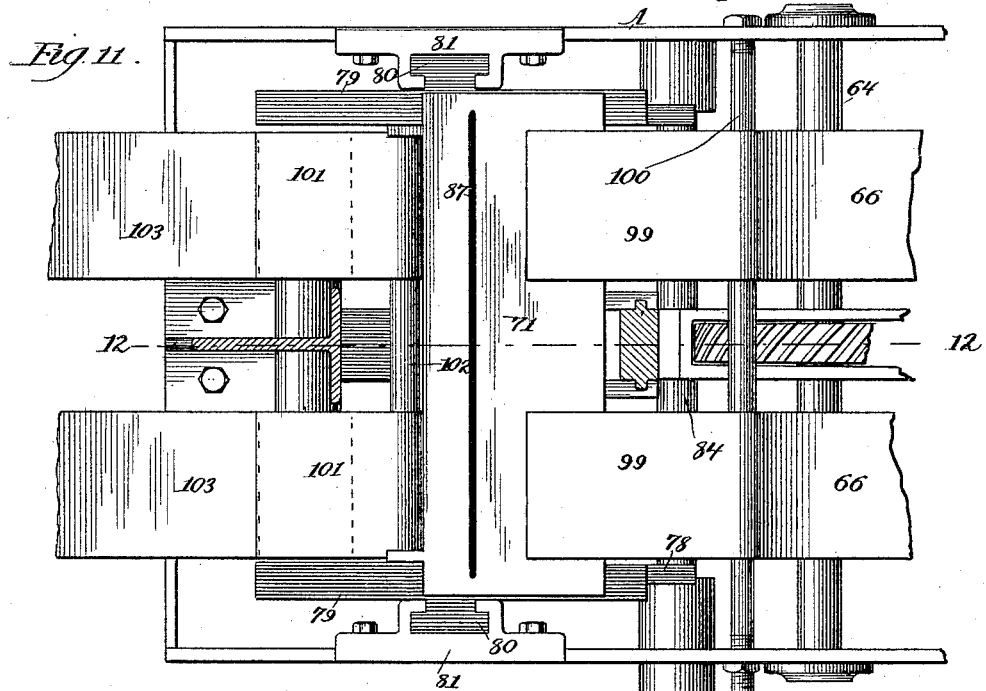
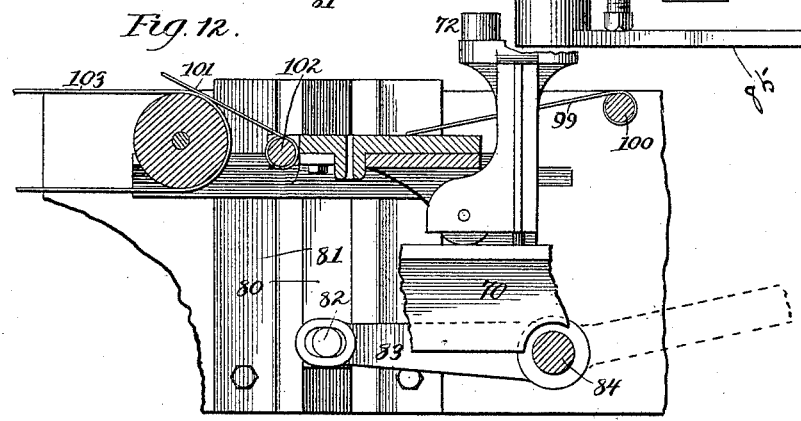
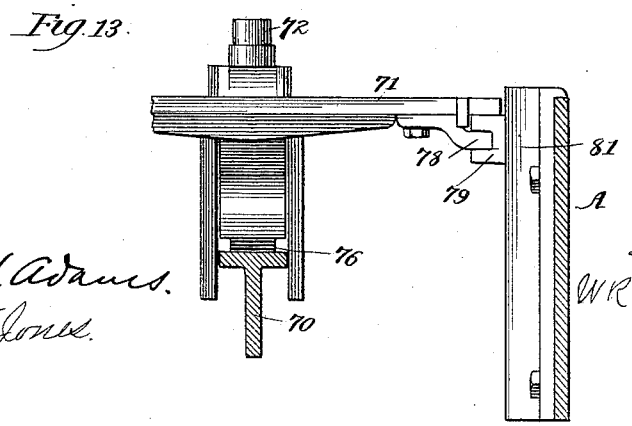
Witnesses:
Albert H. Adams
Harry T. Jones
Inventor:
W. R. Cunningham
N. PETERS, Photo-Lithographer, Washington, D. C.

UNITED STATES PATENT OFFICE.

WILLIAM R. CUNNINGHAM, OF FRANKFORT, INDIANA, ASSIGNOR TO THE WALLACE MANUFACTURING COMPANY, OF SAME PLACE.

MACHINE FOR CUTTING BRICK OR OTHER CLAY PRODUCTS.

SPECIFICATION forming part of Letters Patent No. 411,546, dated September 24, 1889.

Application filed July 18, 1889. Serial No. 317,967. (No model.)

*To all whom it may concern:*

Be it known that I, WILLIAM R. CUNNINGHAM, residing at Frankfort, in the county of Clinton and State of Indiana, and a citizen of the United States, have invented new and useful Improvements in Machines for Cutting Brick or other Clay Products, of which the following is a specification, reference being had to the accompanying drawings, in which—

Figure 5:
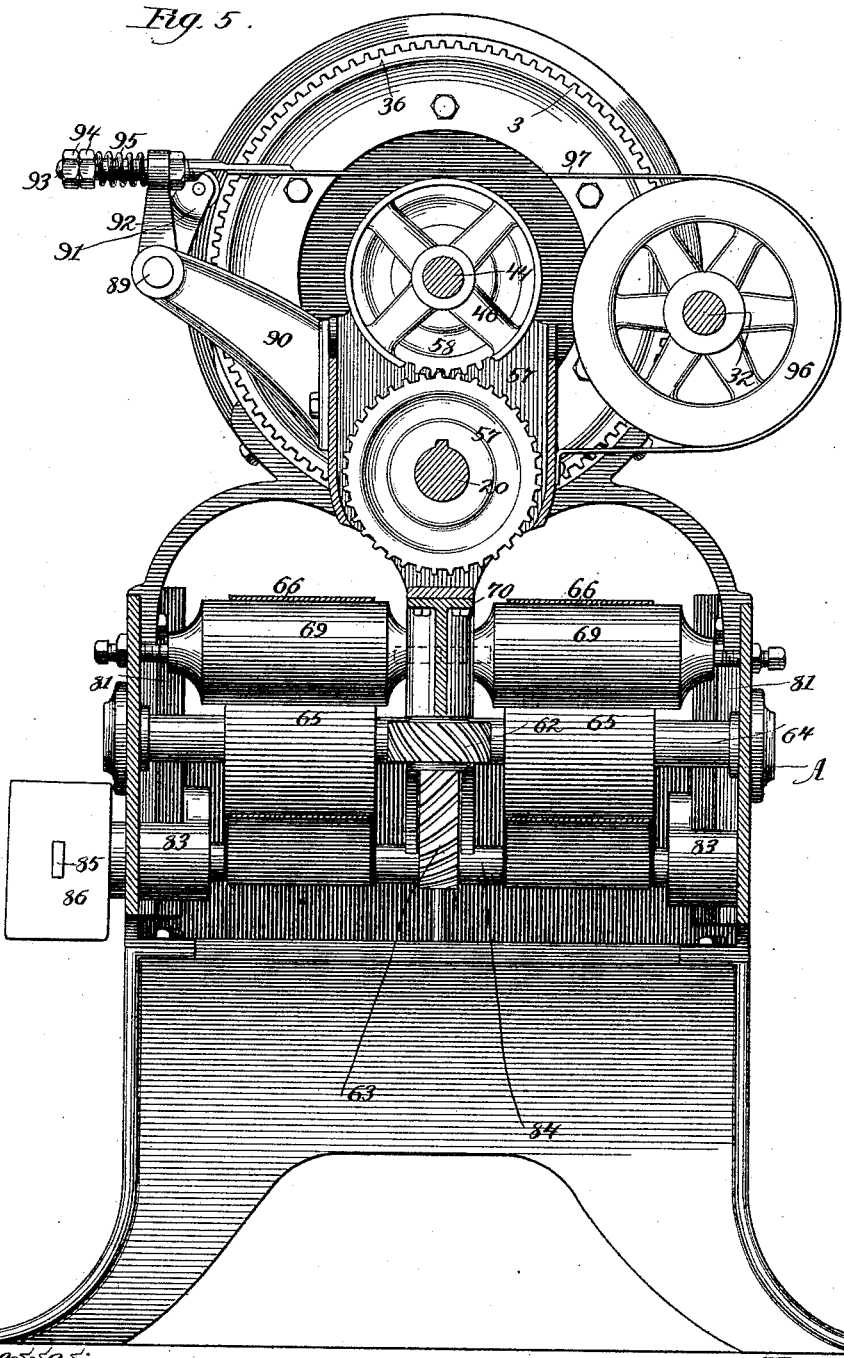
Figure 6:
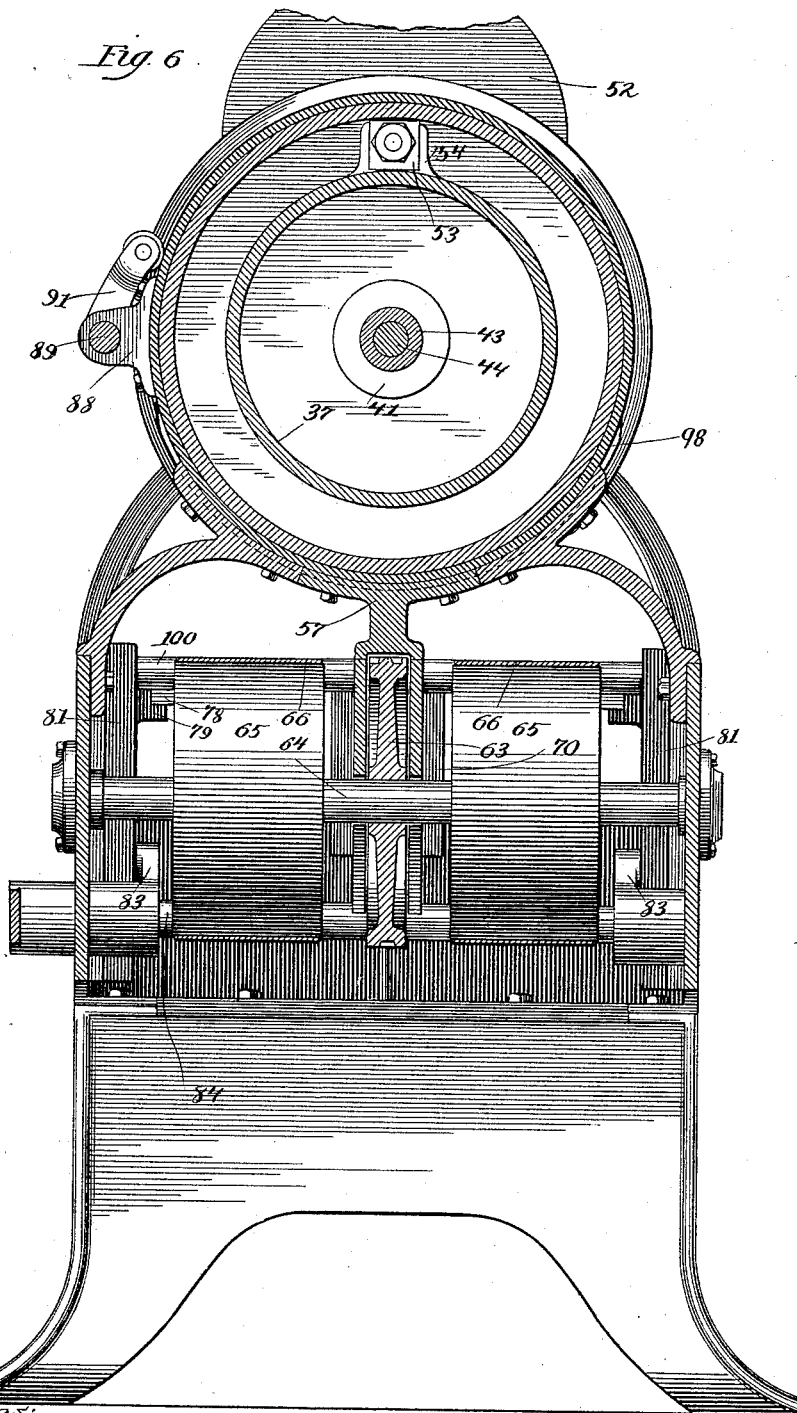
Figure 7:
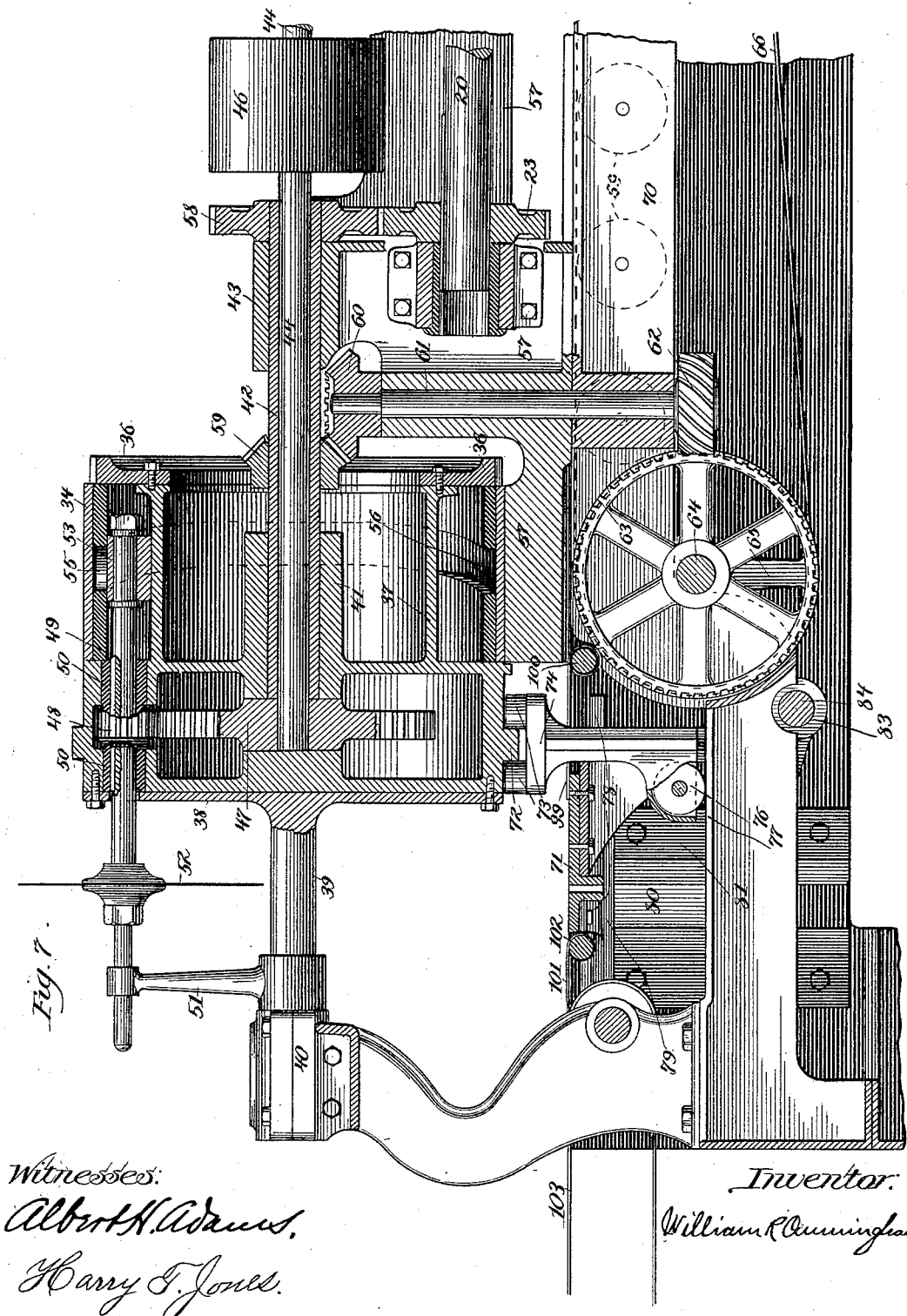

Figure 1 is a side elevation. Fig. 2 is a detail, being a plan showing the shaft which drives the cutter and the supports for such shaft. Fig. 3 is an elevation showing the right-hand end of the machine. Fig. 4 is an elevation showing the opposite end. Fig. 5 is a cross-section at line 5 of Fig. 1. Fig. 6 is a cross-section at line 6 of Fig. 1. Fig. 7 is a central vertical section through a part of the machine. Fig. 8 is a central vertical section through the remaining part. Fig. 9 is a perspective showing the table and part of the main frame, some parts being omitted and broken away. Fig. 10 is a detail, being a perspective of a cross-head which moves in guides connected with the table. Fig. 11 is a partial plan showing the table and carrying-belts. Fig. 12 is a detail, being a central section at line 12 of Fig. 11, some parts being removed and the table depressed. Fig. 13 is a detail showing in elevation part of the table and one of its supports in section. Figs. 3 to 13, inclusive, are on a scale of three-sixteenths of an inch to an inch. The other figures are reduced.

My invention relates to that class of machines which automatically cut brick or other clay product from a bar or stream of clay which issues from the die or dies of a clay-working machine.

The leading objects of my invention are to provide automatic devices by means of which the movement of the stream of clay and the cutter will be uniform, so that the cutting will always be done at the proper time; to provide for the movement of the cutter in the direction in which the clay moves while cutting; to provide a table which moves with the clay while the cutting is being done, and is returned to its normal position automatically, and to provide a yielding table which can descend in case the cutter comes in contact with a stone or other foreign substance, and which will automatically return to its normal position, which I accomplish, as illustrated in the drawings and hereinafter described.

That which I claim as new will be pointed out in the claims.

In the drawings, A represents a frame, preferably made of metal, which supports most of the principal parts of the machine.

B are the side bars of a frame, which may be of wood supported at one end by an iron stand C, and at the other end by castings D, secured to the frame A.

1 is a shaft supported in bearings in the stand C.

2 is another shaft supported in bearings in the castings D.

3 4 are pulleys on the shaft 1.

5 6 are pulleys on the shaft 2.

7 are belts which run over the pulleys 3 and 5 and 4 and 6.

8 are rollers which support the belts, which rollers may be made of wood, and they are supported in bearings in the bars B.

9 is an oblique-toothed gear-wheel on the shaft 1, which wheel drives a pinion 10, which has teeth corresponding with those on the wheel 9, which pinion is on a shaft 11. The gear-wheel 9 and pinion 10 are inclosed in a casing E, bolted to brackets F, which are parts of the stand C. One end of the shaft 11 is supported in bearings 12 at the top of the casing E. The other end of this shaft is keyed to a cap 13, which is bolted to a sleeve 14, which is supported in a bearing 15, which is bolted to the bed-plate of the main frame A.

16 is a flange or shoulder near one end of the sleeve 14.

17 is a collar on the sleeve 14.

The shoulder 16 and collar 17 prevent end movement of the sleeve 14. This sleeve is bored out through its whole length, and one end of the interior of the bore is provided with a screw-thread 18, which forms a nut. The other end of the bore is smooth, and forms a guide for one end 19 of the shaft 20, which end 19 is turned down to fit in the sleeve. The other end of this shaft 20 is supported in a bearing 21. A portion 22 of this shaft is screw-threaded, corresponding with the screw-thread on the interior of the sleeve 14.

23 is a gear-wheel on the shaft 20, which shaft is provided with a feather, and there is a corresponding keyway in the hub of this gear-wheel 23, which permits the shaft 20 to move longitudinally.

The pulleys which drive the belts 7, the gear-wheel 9, and pinion 10 are so proportioned that the shaft 11 and the sleeve 14 make one revolution while the stream of clay is moving the length of a brick or other article to be cut.

The clay from the clay-working machine passes in two streams onto the belts 7, and they are moved by the movements of the streams of clay, giving motion to the wheel 9, pinion 10, and shaft 11.

24 is a grooved collar on the shaft 20.

25 is a lever attached to the stem of the governing-valve of a motor which drives the cutting devices, as hereinafter described. The free end of this lever 25 is located in a groove in the periphery of the collar 24. The motor shown in the drawings is designed for steam, and consists of three cylinders 26, 27, and 28, placed around a hub or casing 30 for the crank, which is not shown. Further description of the motor will not be given, as any suitable motor may be used, and no claim is made in this application for the construction of the motor. A gas or water motor may be used instead of a steam motor to run the cutting devices.

31 is a head or projection on the motor, which serves the purpose of a bearing for the shaft 32, one end of which shaft extends into the motor and is provided with a crank. The other end of this shaft is supported by a bracket 33 on the casing 34. (See Fig. 2.)

35 is a pinion on one end of the shaft 32, which pinion engages with and drives the gear-wheel 36, which is secured to the flanged end of a cylindrical gear-casing 37.

38 is a head bolted to the casing 37.

39 is a shaft connected at one end with the head 38, and the other end is supported in a bearing 40.

41 is a hub supported by arms from the casing 37.

42 is a hollow shaft, which is connected with a hub 41. One end of this shaft rests in a bearing 43. The casing 37 is thus supported by the bearings 40 and 43.

44 is a shaft, which is supported in the sleeve 42 and by a bearing 45. This shaft is driven by a pulley 46, which pulley is driven from a counter-shaft. On the shaft 44 and in the casing 37 there is a gear-wheel 47, which drives the pinion 48, located on an arbor 49, which arbor is supported in bearings 50, which are in the casing 37, and by an arm 51, mounted on the shaft 39. The pinion 48 is connected with its arbor by a feather and keyway, the feather being held rigid in the pinion, so that the arbor can have a reciprocating motion.

52 is a disk or circular blade held on the arbor 49 by means of a flange thereon and a suitable clamp.

53 is a guide-block held on the arbor 49 by means of collars and a lock-nut. The guide-block 53 moves in guides 54, which are connected with the casing 37. (See Fig. 6.) This guide-block carries a pin, on which is mounted a roller 55, which moves in a spiral or cam groove 56, which is cut on the inner face of the cam-casing 34, which casing is held stationary, being bolted to a frame 57, which is supported by the main frame A.

58 is a gear-wheel secured to the sleeve or shaft 42, which wheel engages with the gear-wheel 23.

When the shaft 32 and pinion 35 revolve, motion will be communicated to the gear-wheel 36 and casing 37, and the hollow shaft 42, being secured to the hub 41, will revolve, giving motion to the gear-wheel 58, which will give motion to the wheel 23 and shaft 20, and while the shaft 20, with the screw 22 thereon, and the nut 18 rotate at the same rate of speed their position relatively to each other will not be changed; but if the screw and nut rotate at different rates of speed their position relatively to each other will be changed.

59 is a miter gear-wheel on the hollow shaft 42, which wheel engages with the miter gear-wheel 60, secured to a shaft 61, on the lower end of which is an oblique toothed pinion 62, which drives the oblique toothed gear-wheel 63, which is mounted on a shaft 64, supported in suitable bearings, which shaft 64 is provided with pulleys 65. (Best seen in Fig. 5.)

66 are endless belts or aprons, which run over the pulleys 65, and also over pulleys 67 on a shaft 68. These belts run over suitable rollers 69, Fig. 8.

70 is a metal rail, which extends through the center of the main frame A and is a part of such frame. Part of the way this rail is T-shaped, but near the center it is properly formed to furnish a place for the wheel 63, as shown in part in Fig. 5.

71 is a table onto which the streams of clay pass, and the gears which drive the belts or aprons 66 are so proportioned that so much in length of the clay as is required to form a brick or other article to be cut will be delivered onto the table, while the casing 37 and the parts which move with it make one revolution. This table has a reciprocating movement corresponding with that of the cutting-blade, which motion is given to the table by means of a spiral-shaped cam 72, which is bolted to the outside of the casing 37, which cam passes between two rollers 73, mounted on pins on the vertical cross-head 74, which moves in guides 75, secured to the table. (See Figs. 7 and 9.)

76 is a roller at the lower end of the cross-head, which travels on a track 77, which is a part of the center rail 70.

78 are guide-pieces bolted to the under side of the table—one on each side—which guide-pieces move in corresponding guideways 79.

Each guideway 79 is provided with a T-shaped vertical guide 80, which guides 80 move in vertical guideways 81, which are bolted to the inside of the side rails of the main frame. On the lower end of each guide 80 is a pin 82, which enters a hole in one end of an arm 83, which is mounted on a shaft 84, supported in the main frame. Secured to each end of this shaft 84 is an arm or lever 85, provided with a weight 86. The table is held up to its normal position by the weights 86.

87 is a slot in the table to receive the cutting-blade.

If in cutting the clay the blade strikes any hard foreign substance, the table will be forced down and the blade will pass over such substance and the table will be brought back to its normal position by the weights after the blade has passed.

On the casing 34 there is a journal-bearing 88, which supports one end of a shaft 89, the other end of which is supported by a bracket 90, which is bolted to the frame 57. On one end of the shaft 89 there is an arm 91, the upper end of which is forked to receive a roller. Near the other end of this shaft there is another arm 92, the upper end of which is provided with a hole to receive a screw-threaded pin 93, which passes loosely through the hole in the arm 92.

94 are lock-nuts.

95 is a coiled spring around the pin 93.

96 is a fly-wheel on the motor-shaft 32.

97 is a brake-band which passes over the wheel 96. One end of this band is secured to the pin 93, and the other end is secured to the frame. The tension of the brake-band can be adjusted by means of the lock-nuts 94.

On the gear-casing 37 is bolted a segment-shoe 98, the ends of which are inclined. When the blade comes in contact with the bar of clay, the pressure of the clay against the blade causes friction, which has a tendency to revolve the casing 34 suddenly, causing a jerk or backlash, which is overcome by the action of the shoe, which passes under the roller on the arm 91 and rocks the shaft 89 and tightens the brake-band on the fly-wheel 96 of the motor, counteracting the friction of the blade as it passes through the clay, and keeping the machine steady. When the blade passes out of the clay, the roller runs off from this shoe, relieving the brake-band on the fly-wheel.

99 are two metal strips connected at one end with the shaft 100, and the free ends of the strips 99 rest upon the table 71, Figs. 11 and 12.

101 are two other strips of metal connected at one end with a shaft 102, which is supported in bearings connected with the table. These metal strips 99 support the bars of clay after they leave the belts 66, and their free ends descend when the table descends. The severed brick or other material passes over the strips 101 to a delivery-belt 103.

The machine as shown and described is adapted to receive and cut two bars or streams of clay, but might be adapted to receive and cut only one bar or more than two.

The operation, so far as not hereinbefore fully described, is as follows: The machine is arranged relatively to a clay-working machine so that the streams or bars of clay from such clay-working machine will be first delivered upon the belts 7, and from those belts to the belts 66, and from the belts 66 to the table. The movement of the bars of clay will cause the belts to move, which will revolve the gear-wheel 9, giving motion to the pinion 10, shaft 11, and sleeve 14, which contains the screw-thread or nut 18, one revolution being given to such nut as often as the clay is moved forward a distance equal to the length of one brick or other article to be cut, which movement of the nut, supposing the parts to be in the position shown in Fig. 7, will cause the shaft 20 to be screwed out from the nut, thereby opening the governing-valve of the motor by the movement of the lever 25, and motion will be given by the motor to the shaft 32 and pinion 35, which will cause the gear-wheel 36 and casing 37 to be rotated around the shaft 44, carrying the cutting-blade around such shaft as a center. This casing 37 being driven direct from the motor, as described, will make one revolution for each length of brick or other material to be cut. While the casing 37 revolves the roller 55 will travel in the cam-groove 56, and the arbor which carries the cutting-blade will be gradually moved along in the direction in which the bar of clay is moved and with the same speed, so that the cutting will be accurately done. At the same time the arbor 49 will be rotated upon its own axis, giving a rotary movement to the cutter independent of the movement already stated, which movement of the arbor will be given by the action of the pulley 46, shaft 44, gear-wheel 47, and pinion 48. This last-mentioned movement of the cutter is entirely independent of the travel of the bar of clay, and also independent of the speed of the motor and the parts which it drives. While the cutting is being done the table 71 will move in the direction in which the clay moves with the same speed that the cutter moves in that direction, motion to the table being given by the cam 72 on the outside of the casing 34, which cam operates on the table through the rollers 73 and cross-head 74, which is connected with the table. After the cutting has been performed the cutter and the table will be returned to their first position by the action of the roller 55 and the cam 72. While the cutting devices are in operation motion will be given to the shaft 20 through the gear-wheels 58 and 23, the direction in which this shaft 20 moves being the same as that in which the sleeve 14 moves, so that so long as the nut 18 and the screw 22 on the shaft 20 are running at the same speed the regulating-valve will not move, but will be held open at the same point, and then the machine will be in register with the moving bars of clay. If the bars of clay move faster, the belts 7 will move faster, thereby forcing the screw 22 ahead and opening the regulating-valve more, admitting more steam, and the motor and cutting devices will be driven at an increased speed.

If the bars of clay should move slower at one time than another, the nut 18 would run slower, and therefore the screw 22 would be screwed into the nut, partially closing the governing-valve and partially stopping the flow of steam to the motor, and thereby lessening the speed of the motor and cutting devices.

If the steam-pressure in the boiler increases and the motor moves at a faster speed than before, the screw will enter the nut farther, closing or partly closing the regulating-valve until the cutting device again registers with the flow or travel of the bars of clay.

If the pressure of the steam falls and the cutting devices and the motor slacken their speed, the screw will be forced out from the nut, the regulating-valve will be opened more, admitting more steam and increasing the speed of the cutting devices.

I have thus provided devices by means of which the bars of clay and the movements of the cutting devices will be in unison.

The belts 66 are not driven by the movement of the bars of clay, but are driven positively through the gear-wheels 59 and 60, pinion 62, and gear-wheel 63, being operated directly by the movement of the cutting devices; hence the bars of clay cannot slip on the belts 66, but they will be stretched out between the two sets of belts, and the cuts will be of the same distance apart. The roller 55, moving in the stationary spiral cam-groove, moves the arbor 49 and blade 52 in the direction in which the bars of clay are moving, and while the cutting is being done the casing 37 revolves, carrying the blade across the material at right angles with its travel, thereby cutting the bars square, notwithstanding that they are moving forward while the cutting is being performed.

What I claim as new, and desire to secure by Letters Patent, is as follows:

1. In a machine for cutting brick or other clay products, a belt or apron driven by a bar or stream of clay, a rotating cutter to cut the bar of clay at intervals, and a motor to drive the cutter, in combination with a nut and screw to govern the valve of the motor, one of which is driven by the movement of the bar of clay, the other by the movement of the cutter, substantially as and for the purposes specified.

2. In a machine for cutting brick or other clay products, the combination of a rotating blade on an arbor, a pinion on such arbor, a gear-wheel which engages with such pinion, a shaft 44, which carries said gear-wheel, a hollow shaft 42, and a pulley 46, substantially as and for the purposes specified.

3. In a machine for cutting brick or other clay products, the combination of an arbor 49, carrying a rotating blade, a revolving casing 37, a fixed casing 34, provided with a cam-groove 56, guide-block 53, mounted on the arbor, and roller 55, for the purpose of giving the arbor and blade a reciprocating movement, substantially as and for the purpose specified.

4. A reciprocating table 71, in combination with a revolving casing 37, a spiral cam on the outside of such casing, and an intermediate device between the table and cam, through which the cam moves the table horizontally, substantially as specified.

5. In a machine for cutting brick or other clay products, a table 71, mounted on vertical guides which move in guideways, in combination with weighted levers 85, substantially as and for the purpose specified.

6. In a machine for cutting brick or other clay products, the combination of a table 71, mounted on horizontal and vertical guides which move in guideways, weighted levers 85, cross-heads 74, supported at its lower end on a track, revolving casing 37, and cam 72, substantially as and for the purposes specified.

7. In a machine for cutting brick or other clay products, a table 71, in combination with one or more horizontal strips 101, supported by the table, and a delivery-belt 103, substantially as and for the purpose specified.

8. In a machine for cutting brick or other clay products, one or more strips 99, in combination with one or more belts 66, and table 71, substantially as and for the purpose specified.

9. In a machine for cutting brick or other clay products, a circular blade 52, secured to and rotating with an arbor, in combination with a rotating casing 37, which carries the arbor, whereby the blade rotates around the axis of the casing and at the same time rotates on its own axis, substantially as and for the purposes specified.

10. In a machine for cutting brick or other clay products, a circular blade mounted on a rotating arbor, which is supported in a revolving casing 37, in combination with devices, substantially such as described, for giving to the blade a movement in the direction of the movement of the stream or bar of clay to be cut, substantially as and for the purpose specified.

11. In a machine for cutting brick or other clay products, the combination of a nut and screw which engage with each other, one operated by the movement of a bar of clay and the other by devices for rotating a cutter and moving it in the direction of the moving clay for the purpose of causing the cutter and clay to move in the same direction at the same speed, substantially as and for the purpose specified.

12. In a machine for cutting brick or other clay products, a motor which drives clay-working devices, in combination with a screw and nut operated by a stream of moving clay, and arranged to operate the valve of the motor, substantially as and for the purpose specified.

13. In a machine for cutting brick or other clay products, a belt 7, driven by a moving bar of clay, and a second belt 66, in combination with a rotating casing 37, miter-wheels 59 and 60, shaft 61, pinion 62, and gear-wheel 63, substantially as and for the purpose specified.

14. In a machine for cutting brick or other clay products, the combination of a revolving casing 37, provided with a head 38, shaft 39, shaft 44, hollow shaft 42, and arbor 49, carrying a cutter, said arbor being supported by the revolving casing 37 and by an arm 51 on the shaft 39, substantially as specified.

WILLIAM R. CUNNINGHAM.

Witnesses:
 HARRY T. JONES,
 ALBERT H. ADAMS.